US006722190B2

(12) United States Patent
Baeuerle et al.

(10) Patent No.: US 6,722,190 B2
(45) Date of Patent: Apr. 20, 2004

(54) METHOD FOR THE EMERGENCY STARTING OF AN INTERNAL COMBUSTION ENGINE IN THE CASE OF A ROTATIONAL SPEED SENSOR FAILURE

(75) Inventors: Michael Baeuerle, Markgroeningen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,643

(22) PCT Filed: Mar. 7, 2001

(86) PCT No.: PCT/DE01/00856

§ 371 (c)(1),
(2), (4) Date: Mar. 26, 2003

(87) PCT Pub. No.: WO01/83981

PCT Pub. Date: Nov. 8, 2001

(65) Prior Publication Data

US 2003/0154774 A1 Aug. 21, 2003

(30) Foreign Application Priority Data

May 4, 2000 (DE) ........................................ 100 21 645

(51) Int. Cl.[7] ............................................. G01M 15/00

(52) U.S. Cl. ........................................................ 73/116

(58) Field of Search ............................... 73/116, 117.2, 73/117.3, 118.1; 340/438, 455

(56) References Cited

U.S. PATENT DOCUMENTS

| | | | | |
|---|---|---|---|---|
| 4,839,811 A | * | 6/1989 | Kanegae et al. | 701/31 |
| 4,955,336 A | * | 9/1990 | Glowczewski et al. | 123/179.3 |
| 5,778,854 A | * | 7/1998 | Arai | 123/406.59 |
| 6,170,462 B1 | * | 1/2001 | Kondo | 123/406.18 |
| 6,438,487 B1 | * | 8/2002 | Mingo et al. | 701/113 |

FOREIGN PATENT DOCUMENTS

| | | |
|---|---|---|
| DE | 40 26 232 | 2/1992 |

* cited by examiner

*Primary Examiner*—Eric S. McCall
(74) *Attorney, Agent, or Firm*—Kenyon & Kenyon

(57) ABSTRACT

A method for starting a combustion engine including a starter and a speed sensor that supplies an output signal as a function of speed, and a device for measuring the vehicle system voltage to record a characteristic curve of the battery voltage during a starting phase and after the starting phase. The crankshaft position is ascertained from the characteristic curve of the battery voltage, during the starting phase of the combustion engine, in starter operation.

8 Claims, 3 Drawing Sheets

METHOD FOR THE EMERGENCY STARTING OF AN INTERNAL COMBUSTION ENGINE IN THE CASE OF A ROTATIONAL SPEED SENSOR FAILURE

FIELD OF THE INVENTION

The present invention relates to a method for the emergency start of a combustion engine in the event of a failed speed sensor or speed sensors, to permit limited vehicle operation. If the speed sensor fails, no allocation of a camshaft signal of a phase sensor to the crankshaft position is possible during vehicle start.

BACKGROUND INFORMATION

German Published Patent Application No. 40 26 232 relates to a device for monitoring a speed sensor. The device includes a starter having a speed sensor that supplies an output signal as a function of the speed. A device for measuring the vehicle system voltages is provided, and a control unit is provided, in which the output signal of the speed sensor is set in relation to the vehicle system voltage, and a malfunction of the speed sensor may be detectable. The characteristic curve of the vehicle system voltage is evaluated during the starting process of the combustion engine for fault detection. A fault detection is triggered only when a characteristic curve of the vehicle system voltage that is typical for the starting process is detected and, at the same time, no output signal of the speed sensor is detected.

If a speed sensor, which continuously samples a trigger wheel at the crankshaft of a combustion engine, fails, vehicle operation, under emergency conditions, could also occur on the basis of an evaluation of phase sensor signals. A speed signal, with which a limited vehicle operation (limp home) may be possible, may be simulated from the phase sensor signal. If, alternatively, the combustion engine is operated with camshaft control, the location of the camshaft, that is, the position of the camshaft, may be unknown during vehicle start, since the phase sensor is mounted at the indefinitely positioned camshaft. Fluctuations may arise in an angular range up to 40° arc of crankshaft rotation.

During the start of the vehicle, no allocation of the camshaft signal and of the phase sensor to the crankshaft position may be possible. Therefore, neither appropriate injection nor correspondingly matched ignition may be carried out by further systems of the fuel injection system. Consequently, a start of the combustion engine with camshaft control may be impossible if the speed sensor fails.

SUMMARY OF THE INVENTION

An object of an exemplary embodiment of the present invention is to ascertain the crankshaft position by evaluating the battery voltage during starter operation, in the event of a failed speed sensor.

Due to actuation of the starter, which is supplied electricity by a vehicle battery, cyclically repeating compression and decompression phases occur in the individual cylinders of the combustion engine, whether the vehicle is, for example, a 4-cylinder or 6-cylinder combustion engine. The end points of the compression and decompression phases, respectively, of the individual cylinders are determined at the positions of bottom dead center (BDC) and top dead center (TDC). According to the load of the starter during starter operation, which results from the compression and decompression phases of the individual cylinders, the battery current of an energy accumulator feeding the starter assumes a characteristic curve, from which the positions of the respective TDCs and BDCs may be determined. If the starter has finished a number of crankshaft revolutions, it may be possible to reliably allocate the individual TDCs and BDCs to ascertained maximums and minimums, respectively, of the battery current characteristic curve. If the allocation of maximums and minimums to the respective TDCs and BDCs is ensured, injection and ignition at corresponding cylinders may be effected by engine management, according to an injection and ignition sequence stipulated in engine control electronics.

The positions of TDC and BDC, respectively, ascertained from the maximums and minimums of the battery voltage characteristic, may be stored by a corresponding correlation table or a program map repeating the speed/load performance, and kept for future purposes.

DETAILED DESCRIPTION

Figure 1:
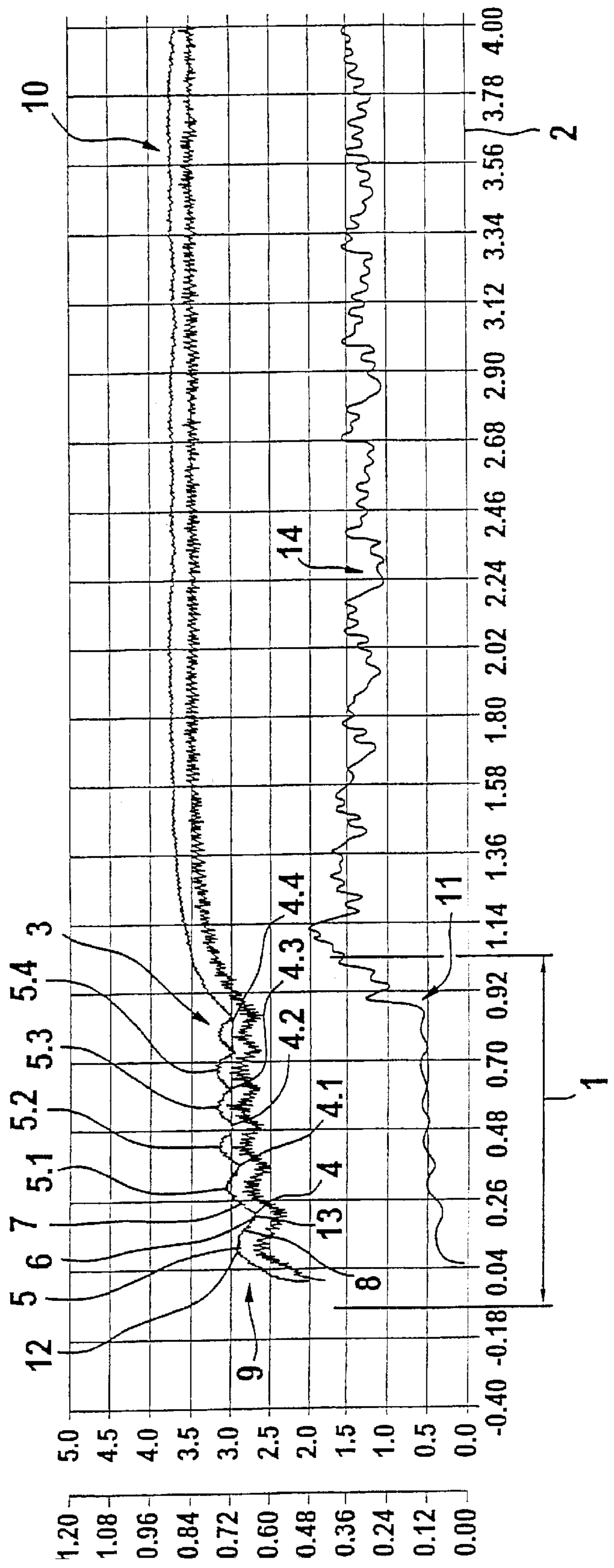
FIG. 1 shows a characteristic curve of a battery voltage and an engine speed, during the operation of a starter and after a combustion engine has started.

FIG. 1 shows characteristic curve 3 of the voltage of a motor-vehicle battery, during starting phase 1 and after the start of a combustion engine. Starting phase 1, during which time the starter of a combustion engine cranks the crankshaft a number of complete revolutions, occurs on first voltage level 9 supplied by the vehicle battery voltage source. Depending on the outside temperature, the internal resistance and the state of charge of the motor-vehicle battery, first voltage level 9 may lie considerably below a voltage level that is generated and maintained by a generator in the combustion engine, after the combustion engine has been started. Characteristic curve 3 of the voltage after the starting phase, which asymptotically approaches a limiting value, shows second voltage level 10, which is supplied by the generator and should essentially correspond to the vehicle system voltage of 12 volts. The second voltage level is independent of the state of charge, the outside temperature and the internal resistance, respectively, since it is supplied and maintained by the generator of the combustion engine.

The exemplary embodiment of FIG. 1 shows battery-voltage characteristic curve 3 and the characteristic curve of the speed of the combustion engine extending over a time span of approximately 4.5 seconds over time base 2. Characteristic curve 3 of the voltage, during starting phase 1, revolves (or shifts) in the shape of a sinusoidal wave between minimums 4.1, 4.2, 4.3, . . . , 4.n and maximums 5.1, 5.2, 5.3, . . . 5.n. A specific one of the maximums 5.1, 5.2, 5.3, . . . , 5.n coincides with a bottom dead center BDC 13, since the load for the starter is lowest at BDC 13.

Maximums 5.1, 5.2, 5.3, . . . , 5.n characterize the specific top dead centers TDCs 12 of the 4 or more respective cylinders of a combustion engine. The highest load acting on the starter occurs shortly before reaching a respective top dead center 12 of a cylinder of the combustion engine, since all valves at the combustion chamber are closed, an elevated pressure prevails in the combustion chamber, the compression phase is terminated, and at this point, the injection of fuel, and therefore, in the case of an Otto (spark ignition) engine, the ignition of the fuel/air mixture may occur.

Injection and ignition present a further load on the battery voltage, which, however, is of secondary importance. Between individual ones of maximums 5.1, 5.2, 5.3, . . . , 5.n and minimums 4.1, 4.2, 4.3, . . . , 4.n, characteristic curve 3 of the battery voltage includes a rising edge 7 and a falling edge 8, which rise and fall according to the compression and decompression at a specific cylinder, from which signals for the positioning of the crankshaft may have already been obtained.

To permit allocation of individual ones of maximums 5.1, 5.2, 5.3, . . . , 5.n and minimums 4.1, 4.2, 4.3, . . . , 4.n, respectively, between individual cylinders of the combustion engine to be started, the starter must be actuated during the starting phase for a sufficiently long time phase. The allocation should be implemented during the first combustion, since in response to errors in a range of approximately 40° arc of crankshaft rotation, reversed rotation of the combustion engine or intake-manifold blowbacks may occur, which is to be avoided.

Figure 2A:
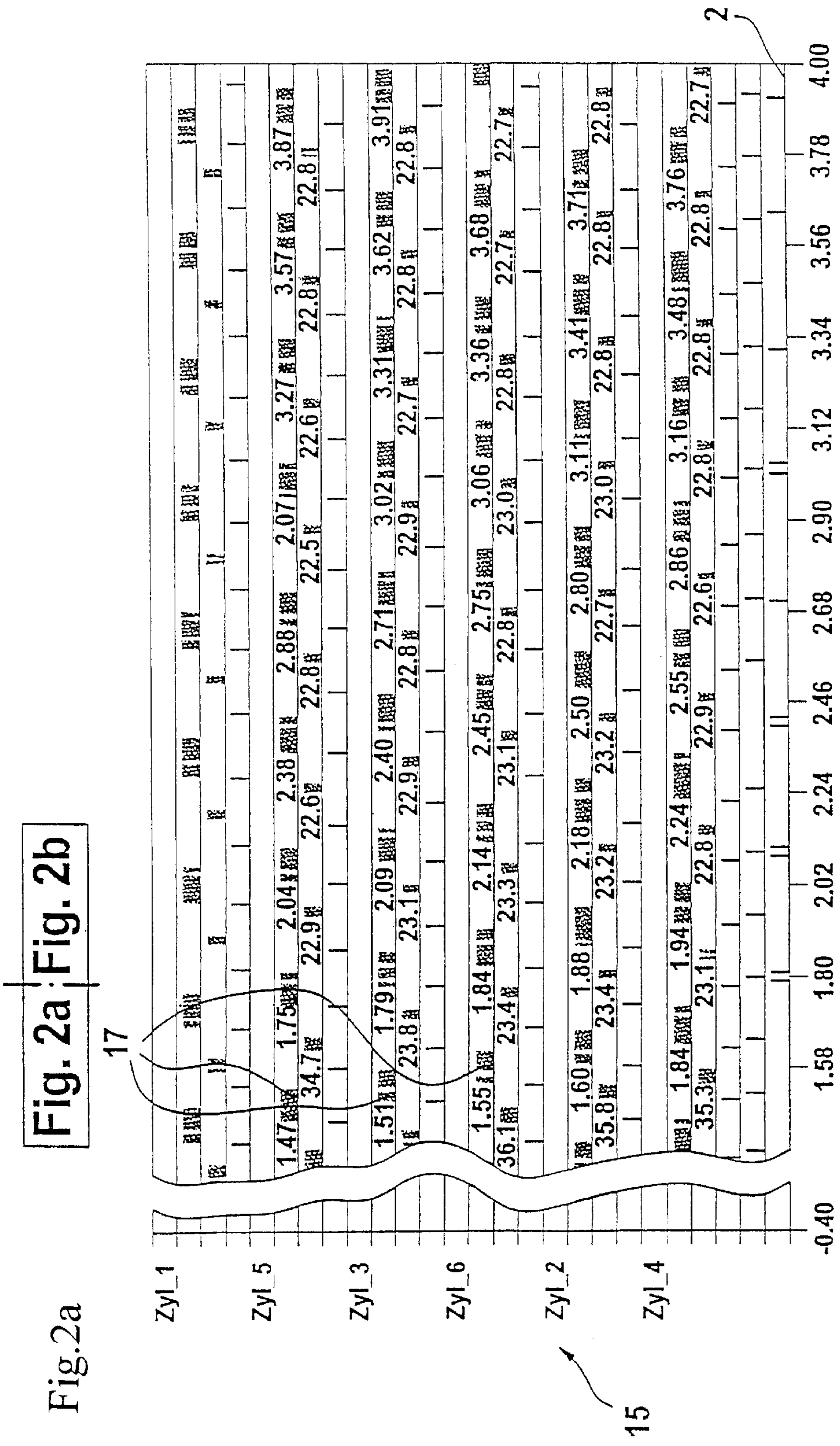
FIG. 2 shows pulse signals of a 6-cylinder combustion engine, during a starting phase and after the start of an combustion engine.
Figure 2B:
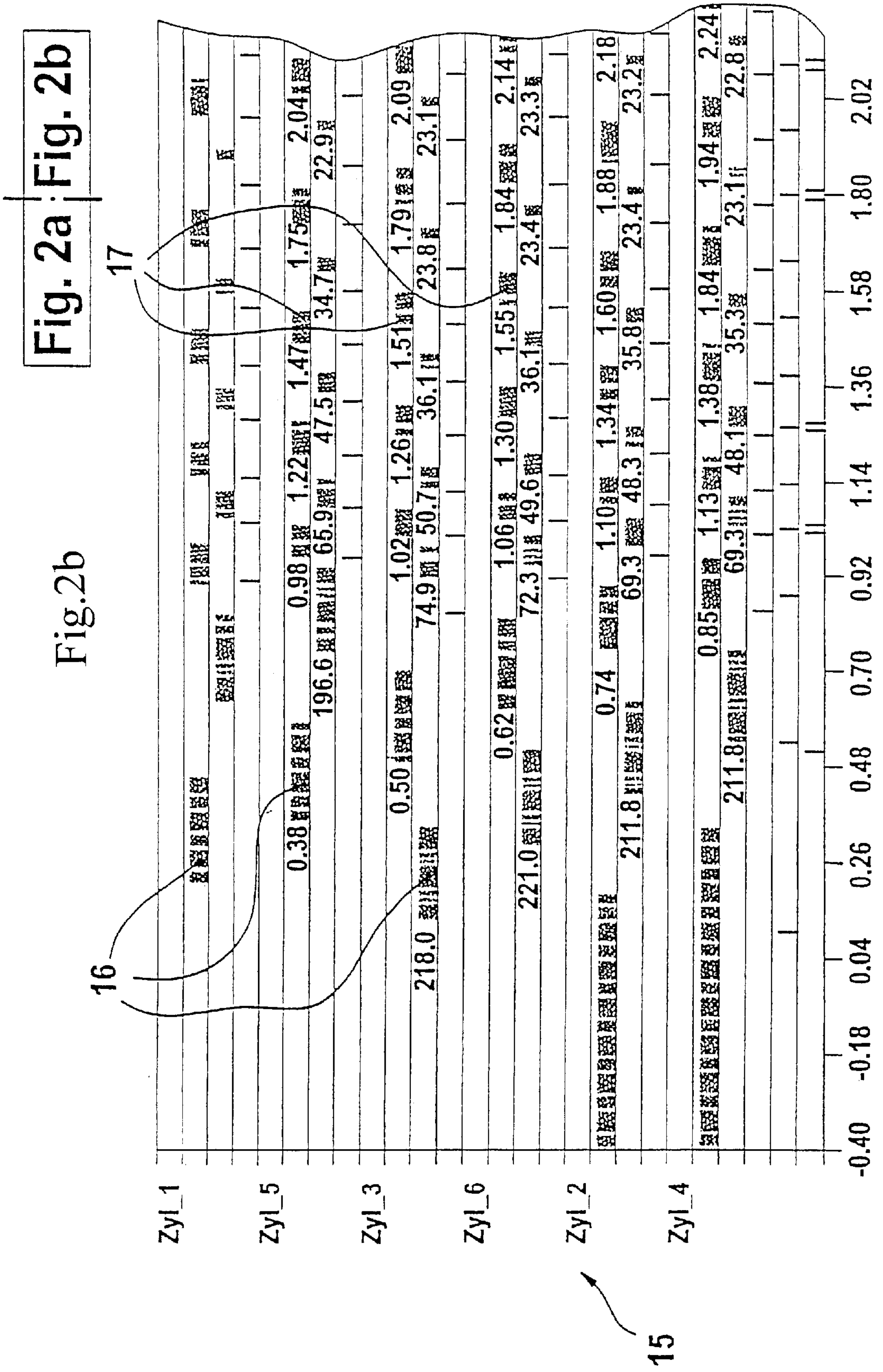

FIG. 2 shows pulse signals of a 6-cylinder combustion engine, during starting phase 1 and during operation, for example, during idling.

Time base 2, which extends over starting phase 1, and the first running phase of the combustion engine covers a time interval of approximately 4.5 seconds, analogous to time base 2 of FIG. 1. During starting phase 1 of the 6-cylinder combustion engine, pulses at individual ones of cylinders 1–6 occur in a first pulse duration 16, while pulses 17, which occur after the combustion engine has been started, are substantially shorter.

The correlation of top dead center 12 and bottom dead center 13 with minimums 4.1, 4.2, 4.3, . . . , 4.n and maximums 5.1, 5.2, 5.3, . . . , 5.n, respectively, of characteristic curve 3 of the battery voltage occurs during the starting of the combustion engine and may be stored, for example, in an engine speed/load map and reused for later purposes, or they may be stored in table form in memory, such as, for example, in a ring buffer store of control electronics for the combustion engine.

The references in the Figures include the following: starting phase starter operation 1; time base 2; battery voltage characteristic curve 3; minima 4.1–4.n; maxima 5.1–5.n; turning point 6; rising edge 7; falling edge 8; first voltage level 9; voltage level 10 during steady-state operation; first combustion 11; TDC 12; BDC 13; speed characteristic 14; ignition sequence 15; cylinders 16 of combustion engine; pulse duration 17 during starter operation per cylinder; and pulse duration 18 during normal operation of combustion engine.

What is claimed is:

1. A method for starting a combustion engine including a starter and a speed sensor for supplying an output signal as a function of a speed, the method comprising:

recording a characteristic curve of a battery voltage on a device for measuring the battery voltage during a starting phase and after the starting phase; and determining a crankshaft position from the characteristic curve of the battery voltage during the starting phase of the combustion engine in a starter operation.

2. The method of claim 1, further comprising: ascertaining maximums and minimums of the characteristic curve of the battery voltage during the starter operation.

3. The method of claim 1, further comprising: determining a position of top dead center and another position of bottom dead center of at least one of a plurality of cylinders of the combustion engine from the characteristic curve of the battery voltage.

4. The method of claim 1, wherein the starter of the combustion engine is actuated during the starting phase of the combustion engine, until the determined maximums are reliably allocatable to a position of top dead center of at least one of a plurality of cylinders and until determined minimums are reliably allocatable to another position of bottom dead center of at least one of the plurality of cylinders becomes possible.

5. The method of claim 1, wherein the characteristic curve of the battery voltage during starter operation occurs on a first voltage level that depends on an outside temperature.

6. The method of claim 4, further comprising: recording and storing in an engine speed/load map one of a correlation of the determined maximums to the position of top dead center and a correlation of the determined minimums to the another position of bottom dead center.

7. The method of claim 4, wherein a first injection and ignition occurs after the maximums are allocated to the position of top dead center and the minimums are allocated to the another position of bottom dead center.

8. The method of claim 1, wherein the characteristic curve of the battery voltage is used for at least one of diagnosis and monitoring of at least one of the speed sensor, a crankshaft sensor, a phase sensor and a camshaft sensor.

* * * * *